(12) United States Patent
Negel et al.

(10) Patent No.: US 8,979,288 B2
(45) Date of Patent: Mar. 17, 2015

(54) SNAP FIT CONNECTION IN A REAR VIEW MIRROR

(75) Inventors: Raimund Negel, Unterensingen (DE); Arne Schmierer, Kirchheim (DE); Andreas Herrmann, Winnenden-Baach (DE)

(73) Assignee: SMR Patents S.a.r.l., Luxembourg (LU)

( * ) Notice: Subject to any disclaimer, the term of this patent is extended or adjusted under 35 U.S.C. 154(b) by 629 days.

(21) Appl. No.: 12/732,715

(22) Filed: Mar. 26, 2010

(65) Prior Publication Data

US 2010/0246038 A1 Sep. 30, 2010

(30) Foreign Application Priority Data

Mar. 27, 2009 (EP) .................................... 09156435

(51) Int. Cl.
*G02B 7/182* (2006.01)
*B60R 1/06* (2006.01)
*B60R 1/072* (2006.01)

(52) U.S. Cl.
CPC .. *B60R 1/06* (2013.01); *B60R 1/072* (2013.01)
USPC ......................................... 359/871; 248/477

(58) Field of Classification Search
USPC .......................................... 359/871; 248/477
See application file for complete search history.

(56) References Cited

U.S. PATENT DOCUMENTS

| | | | |
|---|---|---|---|
| 4,696,555 A * | 9/1987 | Enomoto ........................ | 359/874 |
| 4,981,279 A * | 1/1991 | Andreas et al. ............... | 248/483 |
| 6,168,279 B1 * | 1/2001 | Schnell ........................... | 359/872 |
| 6,347,872 B1 | 2/2002 | Brechbill et al. | |
| 6,712,329 B2 * | 3/2004 | Ishigami et al. ........... | 248/475.1 |
| 6,830,352 B2 | 12/2004 | Lang et al. | |
| 6,866,392 B2 * | 3/2005 | Hayashi ......................... | 359/841 |
| 7,033,033 B2 * | 4/2006 | Ishigami ........................ | 359/872 |
| 7,048,393 B2 * | 5/2006 | Sugiyama ..................... | 359/871 |
| 7,427,142 B2 * | 9/2008 | Onuki ............................ | 359/841 |
| 7,448,589 B2 | 11/2008 | Blakeman et al. | |
| 7,883,223 B1 * | 2/2011 | Foote et al. .................... | 359/841 |
| 2006/0087754 A1 | 4/2006 | Blakeman et al. | |

FOREIGN PATENT DOCUMENTS

| | | |
|---|---|---|
| DE | 19830173 | 1/2000 |
| DE | 10102451 | 3/2003 |
| DE | 102005050603 | 9/2007 |
| EP | 0567245 | 10/1993 |
| EP | 0614783 | 9/1994 |
| GB | 1202646 | 8/1970 |
| GB | 1459101 | 5/2010 |
| WO | 9629213 | 9/1996 |
| WO | 0071387 | 11/2000 |

OTHER PUBLICATIONS

European Search Report for application No. EP09156435, dated Jul. 31, 2009.
English translation of EU Search Report for application No. EP2233360 B1 dated Apr. 5, 2012.

* cited by examiner

*Primary Examiner* — Ricky D Shafer
(74) *Attorney, Agent, or Firm* — Reising Ethington PC

(57) ABSTRACT

The invention is related to an external rear view mirror assembly including a positive connection that fits mirror components as a support frame mounted to a mirror housing or shell. The positive connection is a connector having a two part snap-fit connector with a first snap-fit connector part and a second snap-fit connector part.

5 Claims, 5 Drawing Sheets

SNAP FIT CONNECTION IN A REAR VIEW MIRROR

The invention is based on a priority patent application EP 09156435.1, which is hereby incorporated by reference.

BACKGROUND OF THE INVENTION

1. Field of the Invention

The invention is related to an external rear view mirror assembly comprising a positive connection that fits mirror components as a support frame mounted to a mirror housing or shell. More particularly, the invention is related to method to assemble a rear view mirror in a few steps.

2. Description of the Related Art

External mirror assemblies are ubiquitous for contemporary motor vehicles and have long been used to aid the driver in operating the vehicle, especially in improving the rearward view of the driver. Selected components of the mirror assemblies must be connected during the assembly process. For example, a tilt actuator assembly used to adjust the mirror to provide a proper field of view is typically mounted to a rigid frame within the mirror assembly housing and is operably connected to a reflective element. The rigid frame is typically mounted within the mirror assembly housing to provide structural support to the housing and connected the mirror assembly to the vehicle. The various connections are typically made with threaded fasteners, such as screws. The fasteners are separate components which an assembler must select in the proper number and properly install in order to properly assemble the mirror.

At times, the correct number of fasteners may not be installed. Also, the fasteners may not be tightened to the proper torque, thereby loosening over time so that the mirror assembly no longer operates satisfactorily. The failure to install the correct number of fasteners or to tighten the fasteners to the proper torque requires a costly replacement of the affected part(s) and can contribute to a reduction in vehicle safety due to operational failure of the mirror assembly.

One aspect, the invention relates to an improved vehicular mirror assembly comprising a mirror bracket adapted to be mounted to a vehicle; a mirror housing mounted to the base and comprising a rearwardly-facing opening; a reflective element mounted within the mirror housing in register with the rearwardly-facing opening; a tilt actuator mounted to at least one of the mirror housing and the bracket, and to the reflective element for tiltably actuating the reflective element.

In prior art as U.S. Pat. No. 7,448,589 a solution is disclosed that comprises: a snap-fit assembly for interconnecting selected components of a vehicular mirror assembly, the components comprising a mirror housing, a mounting frame having at least one of a first mounting aperture. The snap-fit assembly comprises a first mounting stud with a first portion having a first diameter and a second portion having a second diameter smaller than the first diameter. The second portion is adapted for snap fit communication with the first mounting aperture and the first portion is adapted for supporting communication with the mounting frame.

The snap fit solution according prior art connects support frame and mirror housing several connectors to fix the components. For the snap fit means have circular bodies more than a single mean is necessary to fix components rigidly without the possibility to pivot around one snap fit mean.

SUMMARY OF THE INVENTION

The objective of the invention is to provide an easy snap fit connection that can replace several separate connecting means in prior art and to ease assembly of a rear view mirror by a one screw solution. An advantage of the inventional solution is that the snap-fit connector includes a screw hole. The integration of a screw into a snap fit connector allows replacing all mounting studs for screwing by the connector.

Another advantage of the solution is the cost saving aspect. The plastic parts of a mirror are injection molded parts. Each mounting stud molded in the mirror housing needs to be deformed with movable pistons from the molding form. To use a combination of snap-fit connector with or without screw hole reduces the number of pistons in the molding tool, the scrap rate and the costs of production.

A further advantage of the solution is the use of the inventional snap fit connection for all components of a rear view mirror. For the connection is reliable and strong the invention is only limited by the material and the spring coefficient of the materials.

The solution can be used to connect mirror housing and mirror bezel, to connect the mirror components as lighting elements, turn signal indicators, alert indication modules, security lights running lights, camera systems and assemblies, sensors. Also the cover of a mirror bracket can be mounted in this easy way.

BRIEF DESCRIPTION OF THE DRAWINGS

The invention is shown in the figures and shortly described thereafter. Further advantages and details of the invention are explained in greater detail hereafter on the basis of preferred exemplary embodiments described in the drawing, without the invention being restricted to these exemplary embodiments, wherein.

DETAILED DESCRIPTION OF THE DRAWINGS

Figure 1:
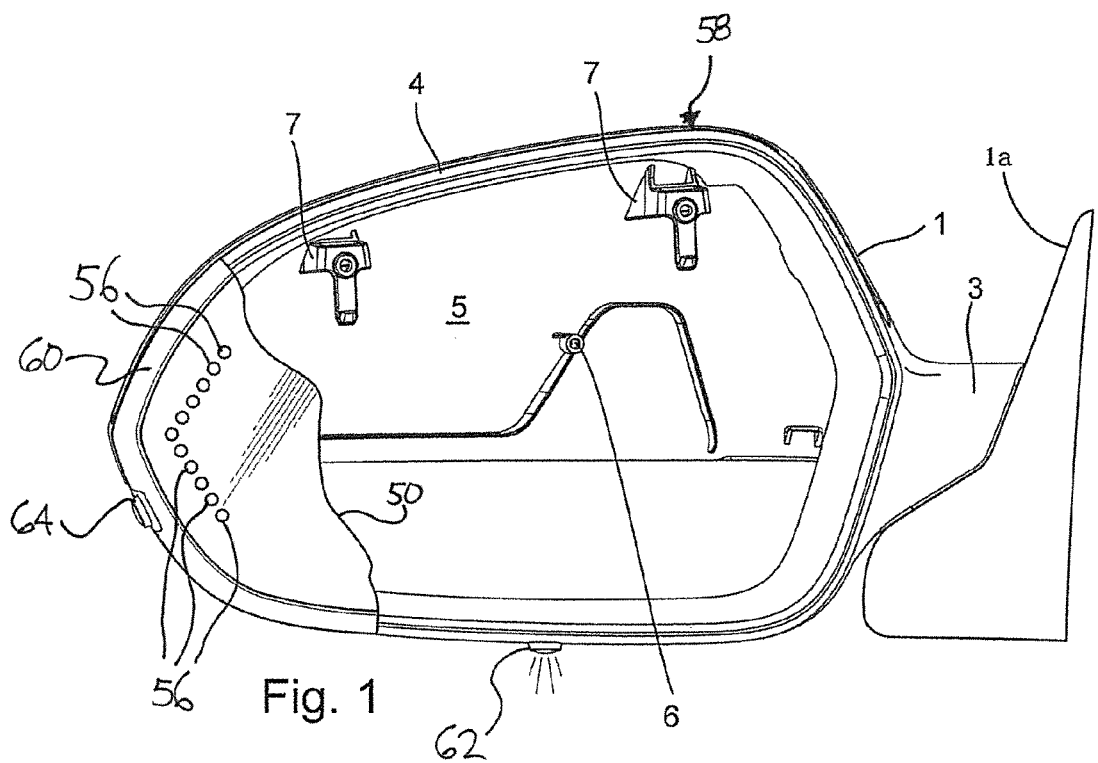
FIG. 1 shows a mirror housing.
Figure 2:
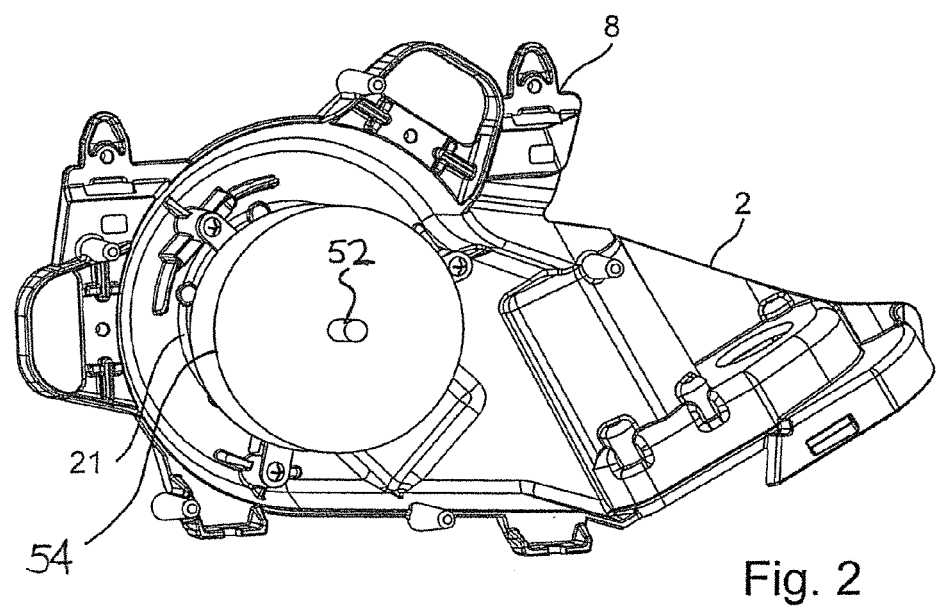
FIG. 2 shows a mirror support.

FIG. 1 shows a schematic view of a rear view mirror housing as used in a mirror assembly. The mirror assembly is mounted in a conventional fashion to a motor vehicle, which is not shown in the figure. The mirror assembly comprises a mirror housing 1 which is one part in this example. The housing 1 encloses a reflective element 50. A mirror support 2, as in FIG. 2, is fixedly mounted within the mirror housing 1 and supports a mounting panel 21 to which is mounted the reflective element 50 via a tilt actuator 52, driven by a motor actuator 54. The housing 1 includes conventional mounting studs 6 and at the backside 5 of the housing 1 and for installation of a turn signal indicator, graphically represented at 56. For the invention the mounting studs are not necessary. The housing and the snap fit devices are moulded in one part in this example. An opening 3 allows inserting support 2 into the housing. Housing 1 comprises a bezel structure protecting the reflective element in the final assembled position. The housing 1 also includes a mirror cover part 58 and a mirror decorative cover 60, as is shown in FIG. 1. The housing 1 may also include a puddle light 62, and/or a camera module 64.

At the backside 5 of the housing two first snap fit connection parts 7 are attached. These first snap fit connection parts 7 are moulded with the housing 1 in one piece.

Figure 5:
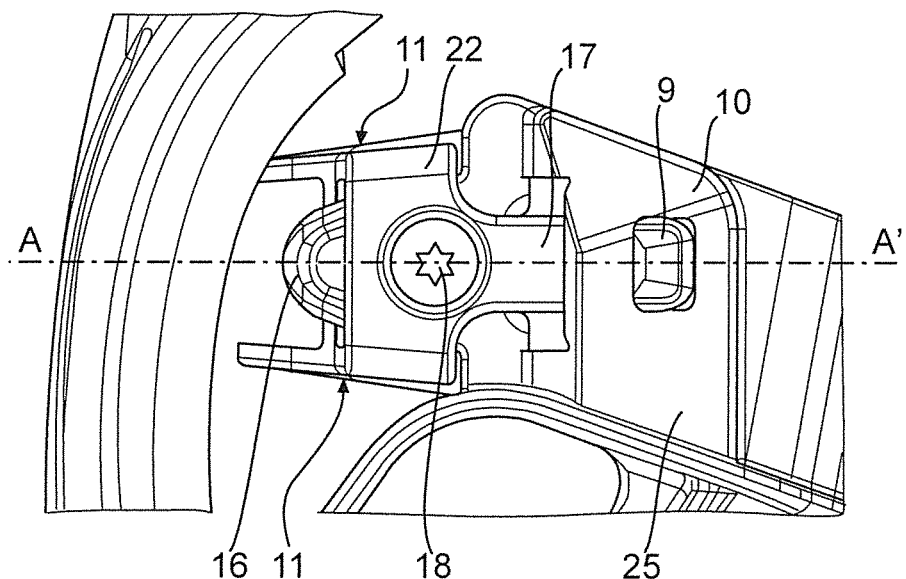
FIG. 5 shows the connectors in mirror assembly.
Figure 6:
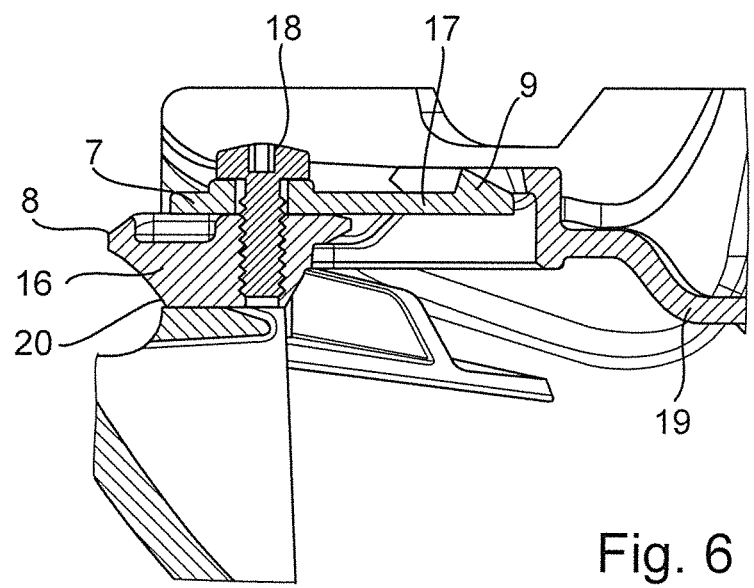
FIG. 6 shows a cross section along axis A-A'.

FIG. 5 shows the mirror support 2 which is an irregularly formed device supporting tilt actuator and reflective element mounted on the mounting panel 21. The part close to the vehicle on the right side of the figure supports a pivotable mount or a power fold actuator to fold mirror in or against direction of vehicle long axis.

The support 2 encloses second snap fit connection parts 8 at the top to the support. To install support into the housing the support is slightly rotated and put into the housing. The second snap fit connection parts are inserted in the first snap fit connection parts and arranged to snap in. The final fixation is in this example be done by screws.

In another embodiment of the invention fixation is done only by snap fit connection avoiding additional steps in assembly.

The easy assembly without screws is limited by the size of the snap fit connection and the parameters for a rigid connection between housing and support. If the snap fit connection is not big enough and the spring forces of the plastic material are not high enough a screw overcomes the problem to get a good connection.

Figure 3:
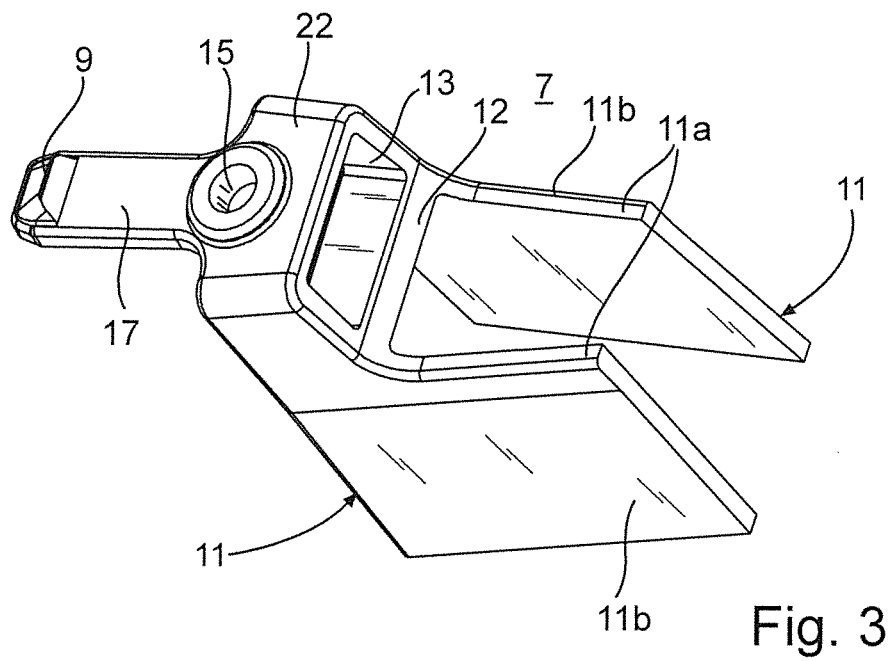
FIG. 3 shows the first part of the inventive connection.

FIG. 3 shows the details of the first snap-fit connection part 7. The snap-fit connection part 7 comprises two walls 11 with wall surfaces 11b separate from each others to create the attachment to the mirror housing. These walls are formed to be adapted to the form of the housing backside 5 and to define the angle for the snap fit connection. The walls are connected via a cross bar 12 and link structure 22 that forms a first aperture 13 in the snap-fit connection part 7.

The link structure 22 is elongated into a lug 17 ending in a hook 9. The hook 9 has sloped faces for an easy insertion of the hook in the snap fit connection.

Figure 4:
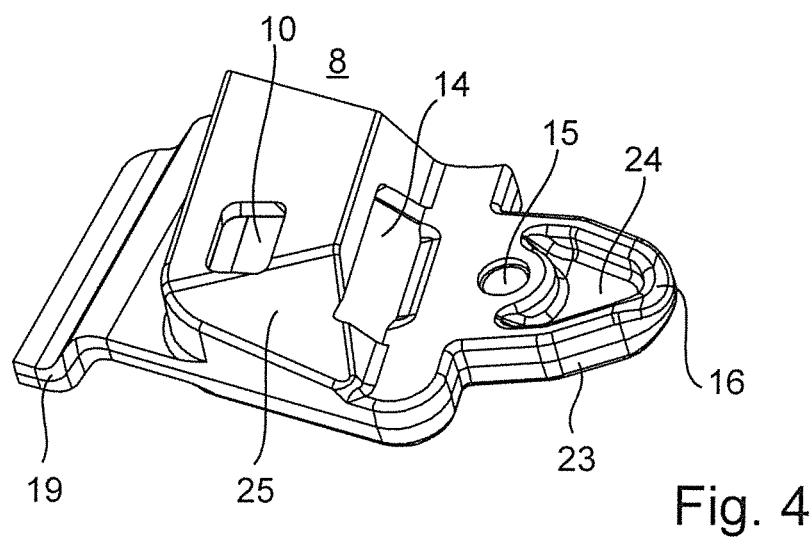
FIG. 4 shows the second part of the inventive connection.

FIG. 4 shows the details of the second snap-fit connection part 8. The distal end of the second snap-fit connection part 8 is attached to the support 2 not shown in this figure. The second snap-fit connection part 8 forms a projection 16 in form of a triangle. The projection is designed with a rigid rim 23 that surrounds a weaker triangle inner part 24. This embodiment is used to reduce the material consumption while the structure has enough stability to connect the parts. The second snap-fit connection part 8 forms a dome 25 including the second aperture 14 and the eye 10.

The second snap-fit connection part 8 forms a second aperture 14 and an eye 10 for the hook and eye connection. The eye 10 is an opening in this embodiment. In another solution the eye is a structure at the backside of the second snap-fit connection part 8 and not visible from the front side.

Both second snap-fit connection parts 7 and 8 comprise a screw hole 15.

FIG. 5 shows the connection of the two snap fit connection parts in a top view. The first snap-fit connection part 7 is visible with the walls 11, the link structure 22 and the lug 17. The lug 17 vanishes under the dome 25 of second snap-fit connection part 8 and only the hook 9 of the lug 17 is visible though the eye 10. The projection 16 is inserted into the first aperture 13.

In the cross section along the line A-A' the connection is visible clearly. The first snap-fit connection part 7 is marked with stripes inclined to the left and the second snap-fit connection part 8 with stripes inclined to the right. What can be seen it that the two parts are put together through the two apertures and fixed by the hook and eye snap fit solution and in this embodiment by a screw 18. The projection of the second snap-fit connection part 8 shows a dog 20 for increasing stiffness and easier insertion of the projection part.

Figure 7:
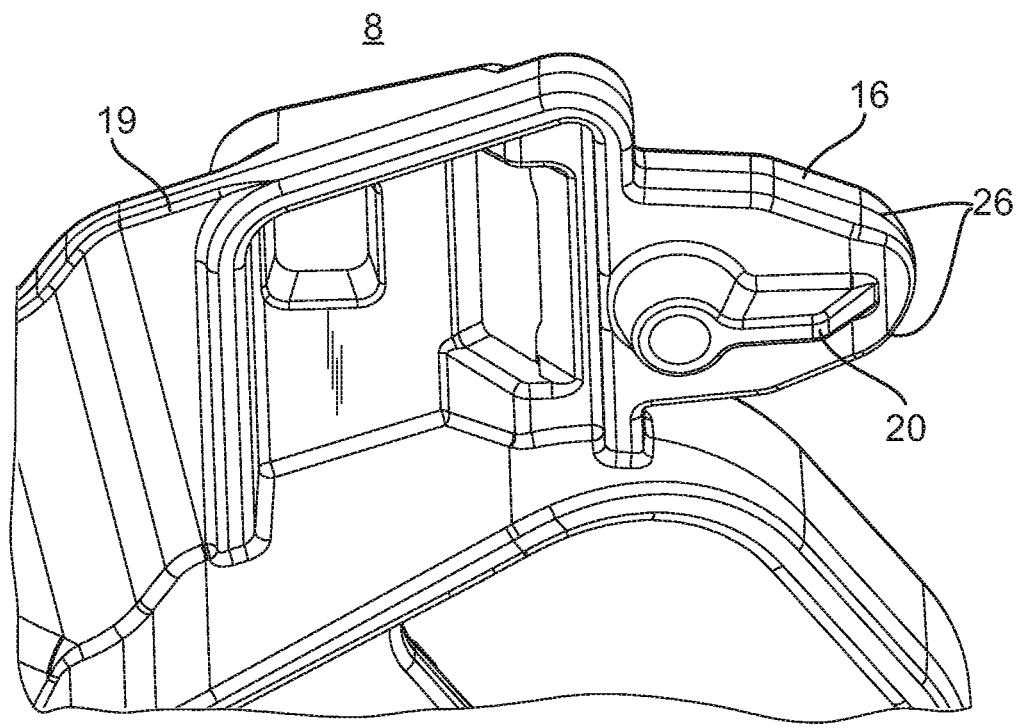
FIG. 7 shows a back view of the second part of connection.

FIG. 7 shows the projection 16 of the second snap fit connection part 8 from the backside of the device. The projection has a dog 20 with s sloped surface edge in direction of insert of the projection into aperture 13. The dog guides the projection 16 in the third spatial direction, while the shoulders 26 guide the projection in the two other spatial directions.

The embodiment allows an easy and precise positioning of the support into the housing.

Figure 8:
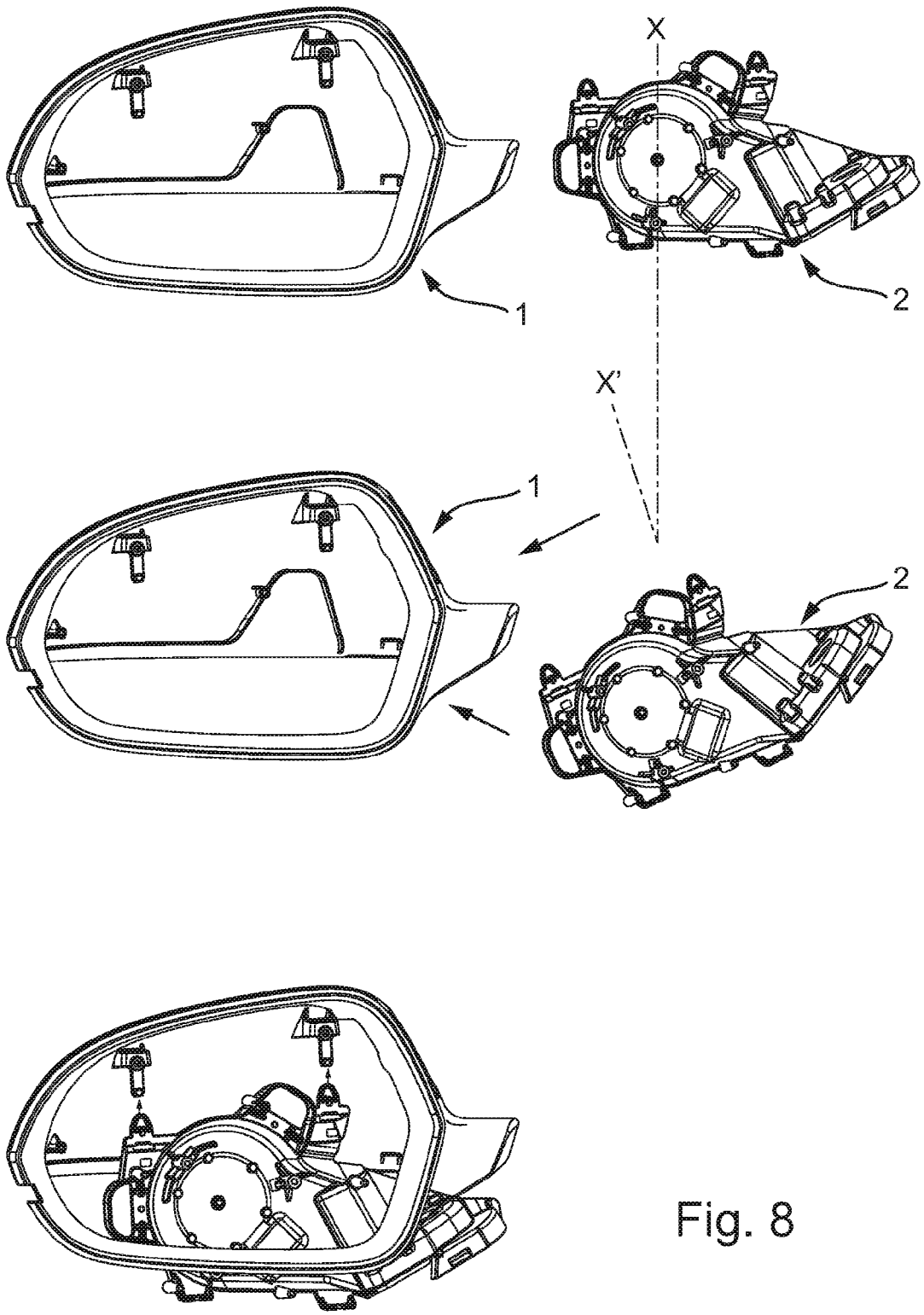
FIG. 8 show schematically the assembly process.

In the assembly process according FIG. 8 the support frame 2 is rotated from a first position with an axis x by a small angle so that axis x' of the support is inclined versus the mirror housing. The support is put into the mirror housing and rotate back to a position with axis x' is collinear to axis x.

Afterward the support is shifted in x direction to connect the two parts of the snap-fit connection.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

LEGEND

1. Mirror Housing
2. Support
3. Opening at Housing
4. Bezel
5. Back Side of Housing
6. Mounting Stud
7. Snap Device Part 1
8. Snap Device Part 2
9. Hook
10. Eye
11. A) Wall; 11. B) Surface of Wall
12. Cross Bar
13. Aperture in Part 1
14. Aperture in Part 2
15. Screw Hole
16. Projection
17. Lug
18. Screw
19. Distal End
20. Dog
21. Mounting Panel
22. Link Structure
23. Rim
24. Triangle Part 1
25. Dom
26. Shoulder

The invention claimed is:

1. A rear view mirror assembly comprising: a mirror bracket; a mirror housing with an opening and a first snap-fit connector part formed integrally therewith; a reflective element housed within the mirror housing and received thereby through the opening; a support frame with a second snap-fit connector part formed integrally therewith, wherein the first snap-fit connector part includes two walls connected via a cross-bar and a link structure that form a first aperture, the second snap-fit connector part forms a dome including a second aperture, a snap-fit lug of the first snap-fit connector part intrudes into the second aperture of the second snap-fit connector part and a projection of the second snap-fit connector part intrudes into the first aperture of the first snap-fit connector part such that the support frame is secured directly to the mirror housing, wherein the projection has a dog on the backside to guide projection in the third spatial direction.

2. A rear view mirror assembly according claim 1 characterized in that the projection has a triangle shape.

3. A rear view mirror assembly according claim 2 characterized in that the second snap-fit connector part is positioned at a top of the support frame.

4. A rear view mirror assembly according claim 1 characterized in that the projection has a two guiding shoulders to guide the projection in two spatial directions.

5. A rear view mirror assembly comprising: a mirror bracket; a mirror housing with an opening and a first snap-fit connector part formed integrally therewith; a reflective element housed within the mirror housing and received thereby through the opening; a support frame with a second snap-fit connector part formed integrally therewith, wherein the first snap-fit connector part includes two walls connected via a cross-bar and a link structure that form a first aperture, the second snap-fit connector part forms a dome including a second aperture, a snap-fit lug of the first snap-fit connector part intrudes into the second aperture of the second snap-fit connector part and a projection of the second snap-fit connector part intrudes into the first aperture of the first snap-fit connector part such that the support frame is secured directly to the mirror housing, wherein the snap-fit lug and the dome define a hook and eye connection.

* * * * *